Sept. 22, 1959

C. K. MARKLEW 2,905,929

CONTROL MEANS FOR A MACHINE WHICH IS TO
OPERATE ON A PREDETERMINED CYCLE

Filed Oct. 22, 1953

United States Patent Office 2,905,929
Patented Sept. 22, 1959

2,905,929

CONTROL MEANS FOR A MACHINE WHICH IS TO OPERATE ON A PREDETERMINED CYCLE

Cecil K. Marklew, Coventry, England, assignor to Alfred Herbert Limited, Coventry, England Application October 22, 1953, Serial No. 387,662

Claims priority, application Great Britain February 28, 1953

2 Claims. (Cl. 340—174)

This invention relates to a machine which is to operate on a predetermined cycle, the various slides or other elements of the machine involved in the cycle being controlled by different electro-responsive devices.

That is to say, the electro-responsive devices might be electric motors, in which case it would be important to provide them with brakes which would rapidly bring them to rest when they were de-energised. A simpler arrangement probably includes the use of magnetic clutches as the electro-responsive devices, an appropriate power means being provided for driving the different clutches when engaged. When hydraulic pressure, or pneumatic pressure, is used for actuating the various slides or other elements, the electro-responsive devices can be solenoid-operated valves.

If different speeds are required of any particular element at different times, they could be introduced by different electro-responsive devices. For example, in the case when hydraulic or pneumatic power is used, use could be made of different, appropriately-arranged solenoid valves, each to be actuated by its own electro-responsive device.

The main object of the invention is to provide a very simple, accurate and inexpensive control means for such a machine.

The control means of the invention includes a magnetic wire or tape recorder having oscillations of different frequency pre-imposed on the wire or tape dependently upon the different operations of the machine cycle, and a plurality of relays connected to receive the output of the replay head of the recorder and each tuned (either directly, or by means of tuned circuits) to respond only to one of the said frequencies, the tuned relays being connected, preferably through slave relays, to actuate the respective electro-responsive devices.

Figure 1:
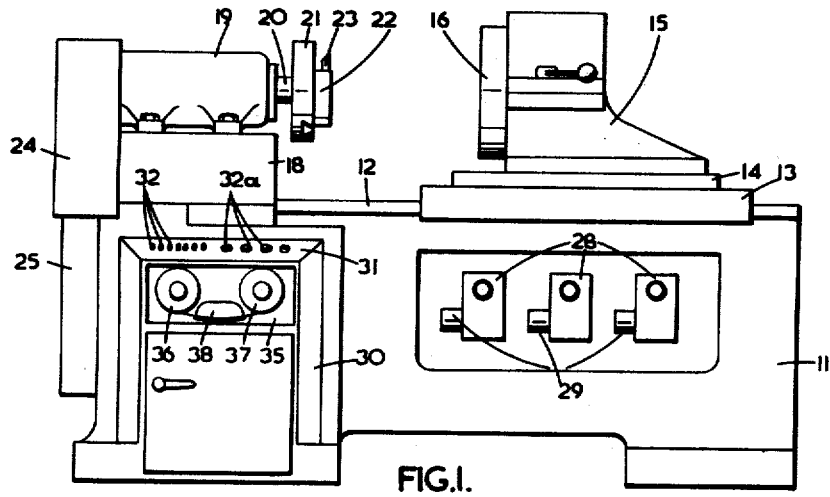
Figure 1 is a front elevation of a horizontal boring machine equipped with the control of the invention.

The horizontal boring machine shown in Figure 1 is of well-known construction, having a bed 11 with horizontal guideways 12 on its upper surface on which is slidably mounted a table 13. The table 13 has a cross-slide 14 on which is slidably mounted a chuck 15 carrying the workpiece 16, and the table and cross-slide are adapted to be moved through the agency of electro-responsive devices.

In the machine illustrated all the motions are derived from hydraulic cylinder and plunger arrangements which are controlled by solenoid operated valves, the motive fluid being supplied by a single hydraulic pump unit driven by an electric motor.

At the remote end of the bed is a headstock 18 carrying a bearing 19 for the mandrel 20 of a tool holder 21, the tool holder having a cross-slide 22 on which is mounted a cutting tool 23. The cross-slide 22 is similarly adapted to be moved by a servo motor (not shown), and the power drive to the tool holder may take the form of belting within the casing 24, 25.

Control valves 28 for controlling the various servo motors and actuated by solenoids 29 are shown in the figure, the hydraulic circuit being of any known form.

Beneath the headstock 18 is shown a cabinet 30 housing the control of the invention, the cabinet having a panel 31 in which are slidably guided press-button switches 32 for the control, and other switches 32a for the main power service of the machine. The magnetic tape recorder above-mentioned is indicated at 35, the tape reels 36, 37 and the record/erase/play-back head 38 being diagrammatically indicated.

Figure 2:
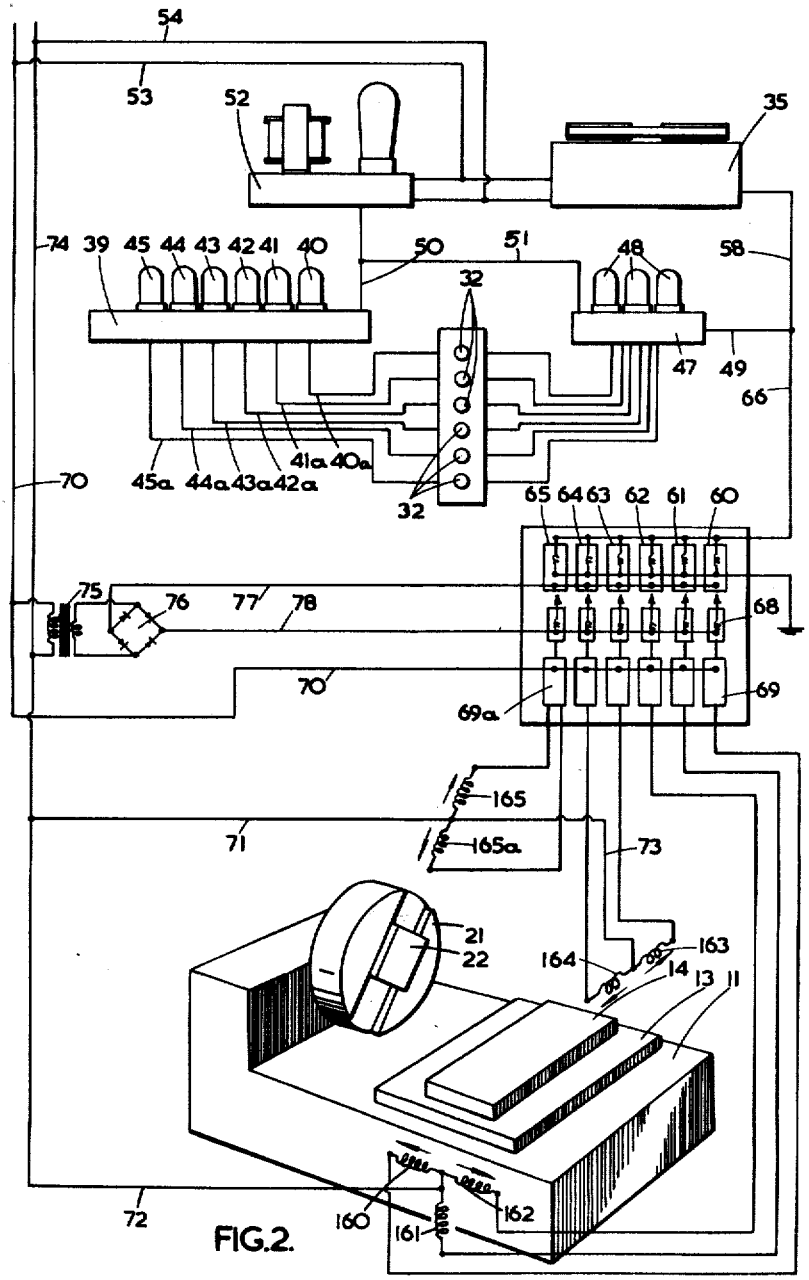
Figure 2 is a schematic diagram of the electrical circuits of the control.

Figure 2 shows schematically a control having six oscillators, and which can therefore control six independent movements of the machine slides, the movements to be controlled, in the present instance, being:

(a) Movement to the left and to the right in Figure 1 of the table 13, and also movement of a positive stop therefor;

(b) Movement of the cross-slide 14 in both directions transversely of the table 13; and (c) Movement of the tool cross-slide 22 to its desired position, where it is held against a stop until the work is finished, after which it is retracted to its original position by a normally energised solenoid.

The control, as shown by Figure 2, is provided with an oscillator unit 39 having six oscillator valves 40–45 and the necessary electronic circuits to maintain a constant oscillatory signal on each of the output lines 40a–45a, the lines being normally open-circuited at the press-button switches 32. Each of the switches is respectively connected to a mixing unit 47 by a line to the control grid of, for example, half of a double triode valve 48, the anodes of the respective half-sections being connected in parallel so as to have a common output line 49. The oscillator unit 39 and the mixing unit 47 are supplied, along the lines 50, 51 with a stabilized D.C. voltage from a power pack 52, which is supplied with an A.C. voltage along the lines 53, 54, as is the tape recorder 35.

It will thus be seen that if one or more of the switches 32 is actuated, the respective oscillatory signal or signals will be fed to the mixing unit 47 and will appear as a simple or composite signal on the line 49, whence it can be fed to the "record" input of the tape recorder, via the line 58, and to tuned relays, 60—65, via the line 66.

The tuned relays are, for example, ones of the kind having a reed, which, when the appropriate frequency is applied across its solenoid winding, will vibrate and make and break with an adjacent contact to supply D.C. pulses to an associated relay 68 each of which controls a slave relay 69, as more particularly described hereinafter with reference to Figure 3. The slave relays when actuated establish a positive circuit to respectively control solenoids 160—165, and when not actuated one of them, 69a, also establishes a circuit for a solenoid 165a, the latter solenoid being that referred to in paragraph (c) above-mentioned as the "normally energized solenoid."

The solenoids 160—165 and 165a control the servo motors (not shown) for operating the various slides in the appropriate direction. For example, if the reed of the relay 60 vibrates the solenoid 160 will be energized and the table will be moved in the direction of the arrow drawn adjacent to that solenoid, or, if the reed of the relay 61 vibrates the table will be stopped. The direction of motion of the table 13 on energization of the solenoids 160 or 162 is indicated by the arrows adjacent to those solenoids, that of the cross-slide 14 by the arrows adjacent the solenoids 164 and 163, and that of the tool slide 22 by the arrows adjacent the solenoids 165, 165a.

When the slave relays are not actuated, as stated above, the relay 165a is energized, to ensure that the tool 23 mounted on the tool slide is withdrawn to a position in which it is less susceptible to damage.

The solenoids 160—165 and 165a are preferably A.C. energized and have a common supply line 70 via the slave relays 69, and return lines 71, 72 and 73 to a common line 74. The lines 70, 74 also supply a transformer 75 having a full wave rectifier 76 in its secondary circuit for supplying a D.C. voltage to the relays 68 via the lines 77, 78.

It will be understood that the control of the invention can be used in at least two ways, i.e., the control can be used for moving the appropriate part up to a pre-set stop such as the machine described is normally provided with, in which case the accuracy of the machining operation depends entirely upon the initial setting up of the machine, or it can be used for controlling the various movements directly by the energization and the de-energization of the solenoids 160—165, providing the servo mechanisms are sufficiently sensitive.

Assuming that pre-set stops are to be used, in setting up the control the operator merely has to press the appropriate button 32 to move the table or cross-slide up to its stop, when he would release the button. When movement of another slide is required, he presses another push-button at the moment of initiating the movement of the slide—and this can be carried out independently of whether the movement of the first slide has been stopped or not. And so on. This means that the normal electrical interlocks are not required, the interlocking of each movement being inherent in the recorded cycle.

The oscillatory signals supplied to the tuned relays are also supplied to the tape recorder and imposed on the tape. Thus, when the operator has completed the machining operation he will also have made a recording of all the signals supplied to the tuned relays, and, on changing over the recorder from "record" to "replay," after the rewinding of the tape, the tuned relays will be energized from the output of the tape recorder and the machine will repeat a duplicate cycle under the control of the tape recorder. Preferably the tape recorder is equipped with an automatic rewind for the tape, or a continuous loop of tape is used.

In the case where the machine is not provided with a stop the operator would directly set up the machine with the use of gauges in a manner similar to that described above, the only difference being that the "start" and "stop" are under his direct control.

As will be well understood the press-button switches 32 can be actuated by cams of the appropriate configuration when it is desired to use the machine as a copying machine, i.e., when it is desired to impart differential movements of the table and cross-slides of such complexity that the skill of the operator could no longer be relied upon to be sufficiently accurate.

If this method of control is applied to a standard copying or diesinking machine of the Keller type which is actuated by a tracer and electromagnetic clutches, it would only be necessary to trace once a very simple model made of a soft material which could then be dispensed with. Thereafter, of course, the sequence would be repeatable from the tape. The storage problem of many large models would be simplified as the tape is a better method of retaining the required information.

It is found that the control described operates satisfactorily upon using a basic control frequency of about 260 cycles per second and subsequent control frequencies in steps of about 43 cycles per second, as there is little likelihood of the tuned relays being spuriously actuated by harmonics or sub-harmonics. Also, at the frequency stated the recording of the signals on magnetic tape or wire presents little problem, and the speed of the tape or wire can be kept comparatively low, i.e., between 3.75 and 7.5 inches per second.

Figure 3:
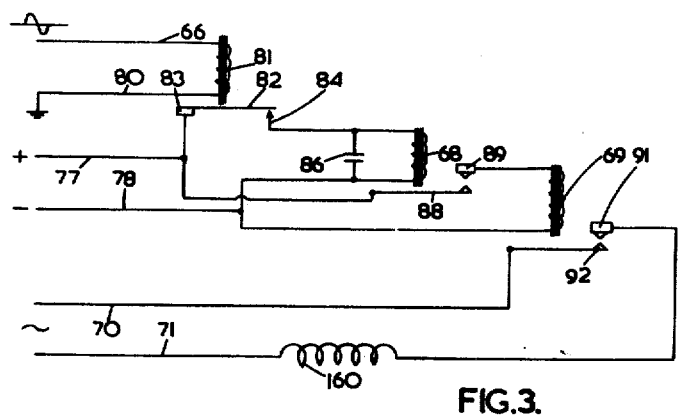
Figure 3 is a circuit diagram of one of the tuned relays and its slave relays.

Referring now to Figure 3, which shows the circuits for one of the tuned relays and its associated slave relay, the signal on the line 66 passes directly to earth line 80 through the winding 81 of the tuned relay. If the frequency applied across the winding 81 is sympathetic to the frequency of oscillation of the reed 82, one end of which is rigidly secured to a support 83, the reed will vibrate and make and break with a fixed contact 84, thus supplying D.C. pulses to a reservoir condenser 86 in parallel with the winding of the holding relay 68 (the D.C. voltage being supplied from the lines 77, 78) to actuate a movable contact 88 of the relay 68 to engage a fixed contact 89. On closure of the contacts 88, 89, the winding of the slave relay 69 is energized and closes its contacts 91, 92 to connect the solenoid (e.g., the solenoid 160) to the power lines 70, 74.

In the case of the slave relay 69a, energization of its winding will cause it to disconnect the solenoid winding 165a and connect the winding 165 to the said power lines.

Figure 4:
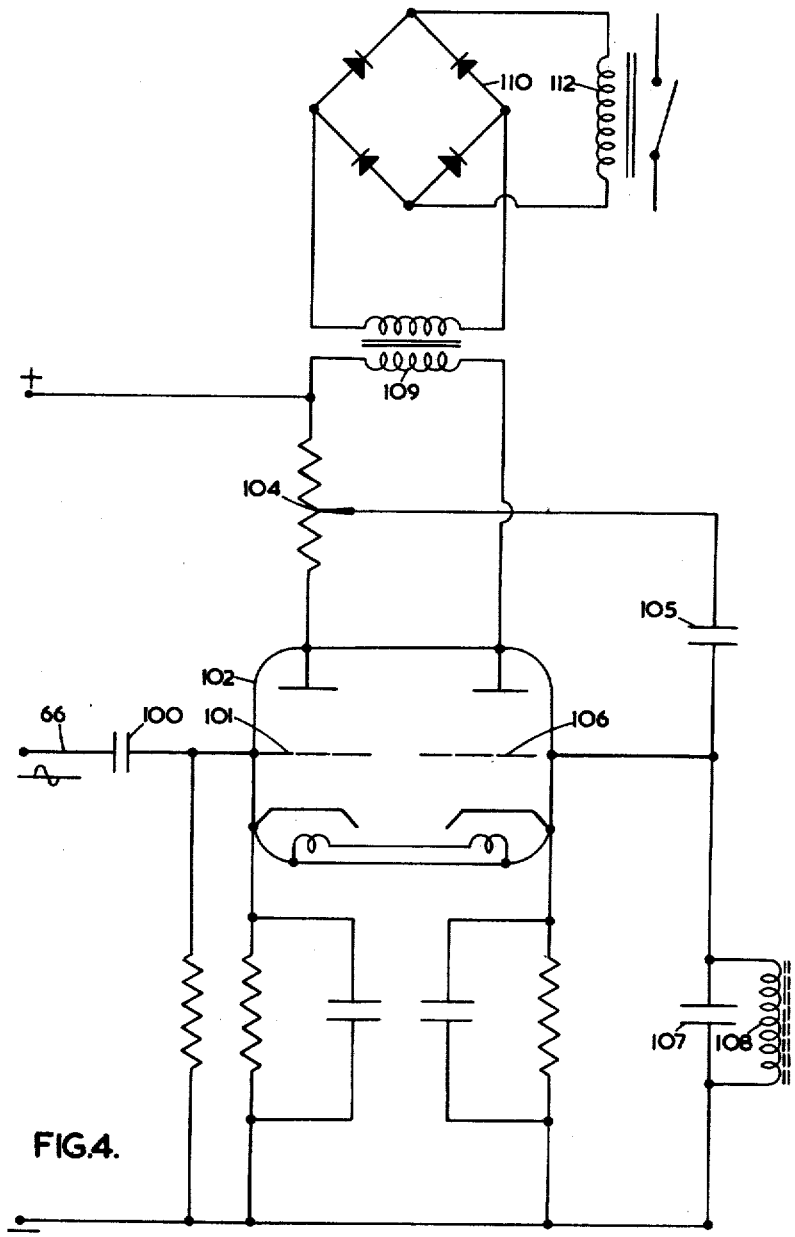
Figure 4 is a circuit diagram of an alternative means for operating the slave relays.

Figure 4 shows diagrammatically an alternative means for operating the slave relays, the tuned relays 60—65 being in this case replaced by simple make and break relays.

The signal fed along the line 66 is passed via a condenser 100 to the control grid 101 of a double triode valve 102, the signal being amplified in that half section and appearing across a potentiometer 104 in the anone circuit. From the tapping of the potentiometer the signal passes via a condenser 105 to the control grid 106 of the other half section of the valve, the earth return from the control grid being through an appropriately tuned rejector circuit, indicated diagrammatically by the condenser 107 and inductance 108, in order that only the required frequency be amplified and applied across the primary winding of a transformer 109 in the anode circuit of the said other half section. The voltage appearing across the secondary winding of the transformer is applied across a rectifying bridge 110, the output of which is applied across the winding of a relay 112, which would replace one of the tuned relays 60—65. Each of the remaining tuned relays would be similarly replaced, and, if desired, the relays 68 omitted, the relay 112 directly controlling the associated slave relay 69.

It will be understood that this circuit is only described by way of example and can be replaced by any other form of frequency discrimination circuit, the output of which would be applied across the bridge 110.

It should be understood that one important advantage of the invention is that a number of similar machines performing the same operation can be controlled from a single tape.

What I claim as my invention and desire to secure by Letters Patent of the United States is:

1. A combination of a machine which is to be operated on a predetermined cycle, the machine having various elements such as slides involved in the said cycle and having an independent electro-responsive device for actuating each element, and a magnetic recorder having a recording head and a replay head and having a recording member such as a tape, an audio-frequency resistance-capacity oscillator corresponding to each element, each oscillator being tuned to a different frequency, discriminating means, such as a tuned relay, for each element, and a control switch corresponding to each element for respectively connecting each oscillator to the recorder and to one of the discriminating means to apply a signal fixed in frequency, phase and amplitude thereto, each discriminating means being connected to actuate one of said independent electro-responsive devices, the combination being so arranged that the machine can be operated by the control switches to record a series of signals on the recording member, and also the recording member can be used to operate the machine in a sequence of operations corresponding to signals pre-recorded on the recording member, each of the signals being of a different fixed frequency and of unvarying phase and amplitude.

2. In a machine which is to be operated on a predetermined cycle, the machine having various elements such as slides involved in said cycle, actuating apparatus for the elements comprising an independent electro-responsive device for actuating each element, a magnetic recording tape having a recording head, an audio-frequency resistance-capacity oscillator corresponding to each element, a potentiometer included in each oscillator for independent tuning thereof, discriminating means in the form of a tuned relay for each element, and a switch by which each oscillator can be connected to the recording head and one discriminating means to apply a signal fixed in frequency, phase and amplitude thereto, each discriminating means being connected to actuate one of said independent electro-responsive devices, said actuating apparatus being so arranged that the machine can be operated by the switches to record a series of signals on the recording tape and also the recording tape can be used to operate the machine in a sequence of operations corresponding to signals pre-recorded on the recording tape, each of the signals being of a different fixed frequency and of unvarying phase and amplitude.

References Cited in the file of this patent
UNITED STATES PATENTS

| | | |
|---|---|---|
| 1,984,379 | Mirick | Dec. 18, 1934 |
| 2,362,827 | Joachim | Nov. 14, 1944 |
| 2,475,245 | Leaver | July 5, 1949 |
| 2,618,770 | Schwarz | Nov. 18, 1952 |
| 2,632,057 | Koenig | May 17, 1953 |
| 2,651,746 | Gano | Sept. 8, 1953 |
| 2,668,283 | Mullin | Feb. 2, 1954 |
| 2,754,496 | Embry | July 10, 1956 |

FOREIGN PATENTS

| | | |
|---|---|---|
| 630,433 | Great Britain | Oct. 13, 1949 |